US009575957B2

(12) United States Patent
Chen et al.

(10) Patent No.: US 9,575,957 B2
(45) Date of Patent: Feb. 21, 2017

(54) RECOGNIZING CHEMICAL NAMES IN A CHINESE DOCUMENT

(75) Inventors: Ying Chen, San Jose, CA (US); Zhong Su, Beijing (CN); Xian Wu, Beijing (CN); Li Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 13/598,692

(22) Filed: Aug. 30, 2012

(65) Prior Publication Data

US 2013/0054226 A1 Feb. 28, 2013

(30) Foreign Application Priority Data

Aug. 31, 2011 (CN) .......................... 2011 1 0254753

(51) Int. Cl.
*G06F 17/27* (2006.01)
(52) U.S. Cl.
CPC ................. *G06F 17/2765* (2013.01)
(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881
USPC ...................................... 704/1–10
See application file for complete search history.

(56) References Cited

U.S. PATENT DOCUMENTS

| | | | | |
|---|---|---|---|---|
| 6,311,152 | B1 * | 10/2001 | Bai et al. | 704/9 |
| 6,975,766 | B2 * | 12/2005 | Fukushima | 382/229 |
| 7,493,251 | B2 * | 2/2009 | Gao et al. | 704/8 |
| 7,676,358 | B2 | 3/2010 | Coden et al. | |
| 8,131,539 | B2 * | 3/2012 | Liu et al. | 704/9 |
| 2004/0243408 | A1 * | 12/2004 | Gao et al. | 704/240 |
| 2006/0136208 | A1 * | 6/2006 | Chung et al. | 704/251 |

(Continued)

FOREIGN PATENT DOCUMENTS

| | | |
|---|---|---|
| CN | 2148367 Y | 12/1993 |
| CN | 1601520 | 3/2005 |

(Continued)

OTHER PUBLICATIONS

Wilbur et al., Analysis of Biomedical Text for Chemical Names; A Comparison of Three Methods, 1999, Proc AMIA Symp., pp. 176-180.*

(Continued)

*Primary Examiner* — Lamont Spooner
(74) *Attorney, Agent, or Firm* — Derek S. Jennings; Patent Mining Works, LLC (57) ABSTRACT

A method and system for recognizing chemical names in a Chinese document. The method includes: receiving a Chinese document including chemical names; recognizing chemical name segments in the document; recognizing non-chemical name segments in the document; and combining the chemical name segments to get chemical names based on the recognized chemical name segments and non-chemical name segments. Specific embodiments of the present invention can effectively recognize chemical names from a chemical document.

12 Claims, 4 Drawing Sheets

(56) References Cited

U.S. PATENT DOCUMENTS

| | | | |
|---|---|---|---|
| 2007/0016612 A1 | 1/2007 | James et al. | |
| 2007/0067280 A1* | 3/2007 | Zhou et al. | 707/5 |
| 2007/0112555 A1* | 5/2007 | Lavi et al. | 704/9 |
| 2007/0112556 A1* | 5/2007 | Lavi et al. | 704/9 |
| 2008/0154581 A1* | 6/2008 | Lavi et al. | 704/9 |
| 2008/0221863 A1* | 9/2008 | Liu et al. | 704/2 |
| 2009/0132464 A1 | 5/2009 | Fliri | |
| 2009/0319257 A1* | 12/2009 | Blume et al. | 704/7 |
| 2009/0326923 A1* | 12/2009 | Yan et al. | 704/9 |
| 2011/0082844 A1* | 4/2011 | Bao et al. | 707/697 |

FOREIGN PATENT DOCUMENTS

| | | |
|---|---|---|
| CN | 1967535 | 5/2007 |
| CN | 102033866 | 4/2011 |

OTHER PUBLICATIONS

Corbett et al., Cascaded classifiers for Confidence-Based Chemical Named Entity Recognition, 2008, BioNLP, pp. 1-136.*

Li Nan et al., Research On Chinese Chemical Name Recognition Based On Heuristic Rules, New Technology of Library and Information Service May 2010.

Song Dan et al., Automatic Index Of Chemical Feature Words Based On Rules, Journal of the China Society for Scientific and Technical Information May 2009.

Lixin Zhang et al., Classification Of Traditional Chinese Medicine . . . , Proceedings of the Fifth International Conference on Information Fusion, 2002, v.2 , p. 1596-1601.

Liang Liang et al., The Identification Of Vocabularies About Medicines And Chemicals In Chinese Commodity Text, Jrnl of Yantai University, Natural Science and Engineering 2002.

Roger Sayle, Foreign Language Translation of Chemical Nomenclature by Computer, Journal of Chemical Information and Modeling, Feb. 24, 2009.

Bingjun Sun et al., Identifying, Indexing, And Ranking Chemical Formulae . . . , ACM Transactions on Information Systems, pp. 1-43, Oct. 2010, vol. 2, No. 3.

Lang Zhou, Number of Issues Concening Chinese Term Extration, http://www.doc88.com/p-988344382283.html, Dec. 31, 2010.

Alfred Aho etal., Efficient string matching: an aid to bibliographic search, Communications of the ACM, pp. 330-340, vol. 18(6), Jun. 1975.

Thomas Cormen etal.. Introduction to Algorithms, Introduction to Algorithms MIT 1 Press Chapter 15: Dynamic Programming. Tt1ird Edition, Cambridge, Massachusetts, 2009.

* cited by examiner

RECOGNIZING CHEMICAL NAMES IN A CHINESE DOCUMENT

CROSS REFERENCE TO RELATED APPLICATION

This application claims priority under 35 U.S.C. 119 from Chinese Application 201110254753.1, filed Aug. 31, 2011, the entire contents of which are incorporated herein by reference.

BACKGROUND OF THE INVENTION

Field of the Invention

The present invention generally relates to the field of information processing technology, and more particularly, to a method and system for recognizing chemical names in a Chinese document.

Description of the Related Art

Currently, with the development of scientific technology in chemistry, the amount of scientific literatures relating to chemistry is increasing, e.g., scientific papers and disclosed patent documents relating to chemistry, among which the number of Chinese documents is also increasing. Chemical name recognition technology proves to be important in the in-depth computer processing of these documents. Those skilled in the art will appreciate that chemical names refer to the names that appear in professional chemistry documents and can uniquely specify the corresponding chemical molecular structures. Chinese chemical names evolve from the IUPAC nomenclature and Chinese common names. The objective of chemical name recognition technology is to automatically detect and identify chemical names from natural language documents, and it is very useful for various data mining in chemical or biochemical fields.

Currently, research has been carried out in English chemical name recognition, which may be mainly divided into two types: one is to use a machine learning model to learn training data to form annotators, and use the annotators to recognize chemical names from plain text documents. Machine learning models mainly include Hidden Markov Model (HMM) (Freitag and McCallum, 1999), Maximum Entropy Markov Model (MeMM) (McCallum et al., 2000) or Conditional Random Fields (CRF) (Lafferty et al., 2001). The other is to carry out chemical name recognition based on rules designed by experts and dictionaries.

There is little Chinese chemical name recognition technology up to now. The reasons for this lie in the following: First, Chinese is much more complex in linguistic structures when compared with English, e.g., there is no explicit word boundary in Chinese (while English words are separated by spaces), and Chinese does not have capitalized information that can be utilized. The distinctive linguistic characteristics prevent applying English chemical name recognition technology to a Chinese environment. Second, current Chinese chemical nomenclature does not precisely coincide with the English chemical nomenclature system; rather, it is a mixture of Chinese traditional nomenclature and IUPAC standard. Therefore, if the manner of model learning is used, at least both the Chinese traditional nomenclature and the IUPAC standard should be taken into consideration. Third, compared to English, there are not many Chinese chemical name resources available, thus it is difficult to carry out Chinese chemical name recognition by means of model learning.

Therefore, there is a need for a method and system for recognizing chemical names in a Chinese document currently.

BRIEF SUMMARY OF THE INVENTION

In order to overcome these deficiencies, the present invention provides a method for recognizing chemical names in Chinese documents, including: receiving a Chinese document including chemical names; recognizing chemical name segments in the document; recognizing non-chemical name segments in the document; and combining the chemical name segments to get the chemical names based on the recognized chemical name segments and non-chemical name segments.

According to another aspect, the present invention provides a system for recognizing chemical names in a Chinese document, including: receiving means configured to receive a Chinese document including chemical names; first recognizing means configured to recognize chemical name segments in the document; second recognizing means configured to recognize non-chemical name segments in the document; and combining means configured to combine the chemical name segments to get the chemical names based on the recognized chemical name segments and non-chemical name segments.

BRIEF DESCRIPTION OF THE SEVERAL VIEWS OF THE DRAWINGS

In the following will be described in detail the features and advantages of the embodiments of the present invention by referring to the following accompanying drawings. If possible, identical or similar reference numerals refer to identical or similar components in the drawings and description. In the drawings.

DETAILED DESCRIPTION OF THE PREFERRED EMBODIMENTS

Detailed description will now be given by referring to embodiments of the present invention; examples of the embodiments are illustrated in the accompanying drawings, wherein similar reference numerals always denote the same elements. It should be appreciated that the present invention is not limited to the disclosed embodiments. It should further be appreciated that not every feature of the method and apparatus is necessary for implementation of the present invention claimed by any one of the claims. Furthermore, throughout the disclosure, when a process or method is illustrated or described, steps of the method can be performed in any order or simultaneously, unless it is clear from the context that one step depends on another preceding step. Furthermore, there can be significant time intervals between steps.

Figure 1:
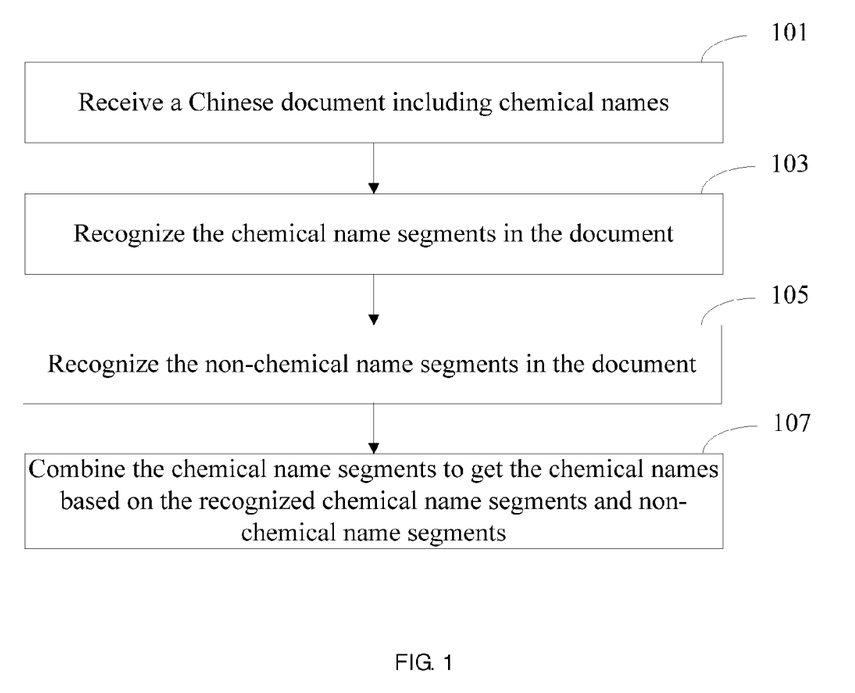
FIG. 1 illustrates a first specific embodiment of the present invention for recognizing chemical names in a Chinese document.

FIG. 1 illustrates a general embodiment of the present invention for recognizing chemical names in a Chinese document. Step 101 includes receiving a Chinese document containing chemical names. The Chinese document can be in any file formats. For example, it can be a plain text document, or a word document, pdf document, XML document and so on. For a Chinese document which is not a plain text document, the Chinese document may be pre-processed to form a plain text document. Here the Chinese document can include Chinese chemical names.

Step 103 includes recognizing the chemical name segments in the document, wherein the chemical name segments refer to characters (letters) or numerals etc. usually used to represent parts of an accurate chemical name. Taking the chemical name 2-[(4-氯-苯基)-(2,4-二氯-苯甲酰基)-氨基]-噻唑-4-甲酸二乙基酰胺 (2-[(4-chloro-phenyl)-(2,4-dichloro-benzoyl)-amino]-thiazole-4-methanoic diethyl amide) as an example, "2-[(4-", "-", ")-(2,4-", "-4-", ")-" are of the numeric segment type in the chemical name segments, "氯", "苯基", "二氯", "苯甲酰基", "氨基", "噻唑", 甲酸二乙基酰胺 are of the character segment type in the chemical name segments. The recognition of the chemical name segments can be performed by matching with a chemical name segment dictionary created in advance, so that the chemical name segments in the document can be recognized one by one. Of course, those skilled in the art can consider any other appropriate recognition manners based on this application. Here, the chemical name segment dictionary can be generated from existing Chinese chemical names and English chemical names, the sources of which include PubChem (PubChem is a knowledge base of chemical names, http://pubchem.ncbi.nlm.nih.gov/), involving structural contents of patents in the chemical field. An existing chemical name can be divided into chemical name segments by using a regular expression. For a Chinese chemical name, 2-[(4-氯-苯基)-(2,4-二氯-苯甲酰基)-氨基]-噻唑-4-甲酸二-乙基酰胺 using the regular expression, [\p{ASCII}]+(finding out all non-Chinese character strings) to decompose, can divide the chemical name into two parts: numeric segments: "2-[(4-", "-", ")-(2,4-","-4-", ")-"; and character segments: "氯", "苯基", "二氯", " 苯甲酰基", "氨基", "噻唑 ", 甲酸二乙基酰胺. For the English chemical name, "2-methyl-3,3-dimethyloctance", the regular expression, [a-z]+(finding out all alphabetic strings), is used to match. The chemical name can be divided into two parts: numeric segments: "2-", "-3-"; and character segments: "methyl", "dimethyloctance". For Chinese chemical name recognition, the numeric segments can be utilized in recognizing the chemical names. A chemical name dictionary is formed with the obtained chemical name segments for later matching. A preferred specific embodiment of recognizing chemical name segments will be described in detail in the following.

Step 105 includes recognizing the non-chemical name segments in the document, wherein the non-chemical name segments refer to characters (letters) or phases, etc., usually not used to represent parts of an accurate chemical name. The recognition of the non-chemical name segments in the document can be performed by matching with a non-chemical name segment dictionary created in advance, so that the non-chemical name segments in the document can be recognized one by one. Of course, those skilled in the art may consider any other appropriate recognition manners (for example, using a finite-state machine to store the dictionary) based on the present application. Here, the non-chemical name segments dictionary can be formed by collecting words with high occurrence frequency from Chinese documents in non-chemical fields. For example, non-chemical documents like those of finance, entertainment, sports, political news, etc. can be collected, and a Chinese word segmenter, e.g., the existing tool, Stanford Parser, can be used to segment words in these documents, and select words with high frequency from all the obtained words to form the non-chemical name segment dictionary for later matching. A specific embodiment of recognizing non-chemical name segments will be described in detail in the following.

Step 107 includes combining the chemical name segments to get chemical names based on the recognized chemical name segments and non-chemical name segments. Since the chemical name segments are not complete chemical names, but only part of them, the chemical name segments are combined to form the chemical names. Here, the non-chemical name segments are used as separators in combining the chemical name segments to get the chemical names: non-chemical name segments are introduced to distinguish between chemical name segments belonging to different chemical names, so as to ensure that chemical name segments belonging to different chemical names are not combined into nonexistent chemical names, i.e., to prevent combining inappropriate chemical name segments. A specific embodiment of combining chemical name segments to get chemical names will be described in more detail in the following.

Figure 2:
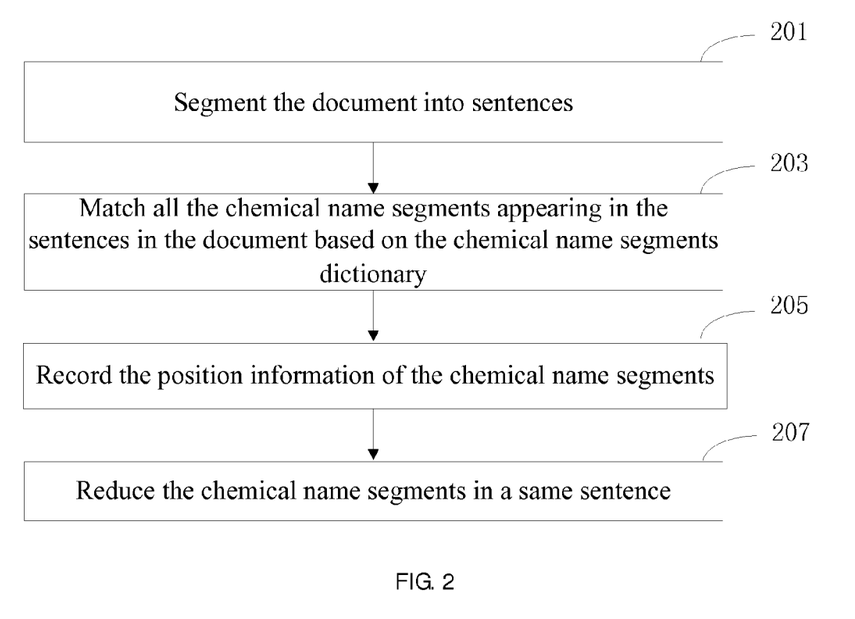
FIG. 2 illustrates a preferred specific embodiment for recognizing the chemical name segments in a Chinese document.

FIG. 2 illustrates a preferred specific embodiment of recognizing chemical name segments in a Chinese document. Step 201 includes segmenting the document into sentences. Punctuations can be used to simply segment it into sentences. Step 203 includes matching all the chemical name segments appearing in the segmented sentences of the document based on the chemical name segment dictionary. A finite-state machine is constructed during the matching (for all the chemical name segments in the dictionary, the finite-state machine is constructed by using character as a basic unit), and the matching is performed in the manner of multi-pattern matching. For details, refer to Aho, Alfred V.; Margaret J. Corasick (June 1975). "Efficient string matching: An aid to bibliographic search". Communications of the ACM 18 (6): 333-340. Since the construction of a finite-state machine and multi-pattern matching are mature prior art, they are omitted here for brevity. Step 205 includes recording the position information of the chemical name segments. The position information of the chemical name segments is recorded upon obtaining the chemical name segments. The position information includes the start position and end position of one of the chemical name segments and non-chemical name segments in the document. For example, if the start position of a chemical segment A is the 100th character in the document, and its end position is the 104th character in the document, then the position of the chemical segment A is (99,103) (here the position of the first character is set as 0). Since the document has been segmented into sentences previously, preferably the position information may record the sequence number of the sentence. Alternatively, the chemical name segments in a same sentence can be stored in a same table for subsequent processing, and the chemical name segments in different sentences can be stored in different tables, so that the sequence numbers of sentences may not be recorded. And in step 205, the initial set of segments are re-selected according to the principle of matching the most chemical name segments with the least number of chemical name segments. Generally, in the obtained large number of matched chemical name segments, many segments may unavoidably overlap with each other; to avoid this situation, a segment subset with minimal conflict is found using the dynamic programming method in accordance with the above principle. The dynamic programming method can be referred to "Introduction to Algorithms," Third Edition. MIT Press Chapter 15: Dynamic Programming. Since dynamic programming is classic prior art, it is omitted here for brevity.

In the following the document (sentence), "二甲基技术领域本发明为一种2,6-甲基萘的分离方法" is taken as an example to describe in great detail the process of recognizing the chemical name segments in a Chinese document. By matching the above sentence with the chemical name segment dictionary, all the chemical name segments of the above sentence as shown in the first column at the left side of Table 1 can be obtained. In Table 1 are recorded at the same time the start position and end position of each chemical name segment in the sentence, for example, the start position "0" and end position "3" of the chemical name segment "二甲基". Since the chemical name segments here have large amount of redundancy, the chemical name segments in Table 1 can be reduced, as in Step 207. Reducing the chemical name segments is performed according to the principle of matching the most chemical name segments with the least number of chemical name segments. For example, "二甲基" (0, 3) includes adjacent "二甲" (0, 2) and "甲基" (1, 3), thus "二甲" (0, 2) and "甲基" (1, 3) can be deleted with only "二甲基" (0, 3) preserved. The rest is done is the same manner, and finally the chemical name segment set is obtained with no conflict of the sentence as shown in FIG. 2, {"二甲基" (0, 3), "2,6-" (13, 17), "二甲基萘" (17, 21)}. In this way, the time for subsequent combination of the chemical name segments will be greatly reduced, and the efficiency and accuracy will be enhanced. Of course, the step of reducing is not necessary.

TABLE 1

| Chemical Segment | Start Position | End Position | Type |
|---|---|---|---|
| 二甲 | 0 | 2 | character |
| 二甲基 | 0 | 3 | character |
| 甲基 | 1 | 3 | character |
| ,6 | 14 | 16 | numeric |
| 2,6- | 13 | 17 | numeric |
| 6- | 15 | 17 | numeric |
| 二甲 | 17 | 19 | character |
| 二甲基 | 17 | 20 | character |
| 甲基 | 18 | 20 | character |
| 二甲基萘 | 17 | 21 | character |
| 甲基萘 | 18 | 21 | character |

TABLE 2

| Chemical Segment | Start Position | End Position | Type |
|---|---|---|---|
| 二甲基 | 0 | 3 | character |
| 2,6- | 13 | 17 | numeric |
| 二甲基萘 | 17 | 21 | character |

Figure 3:
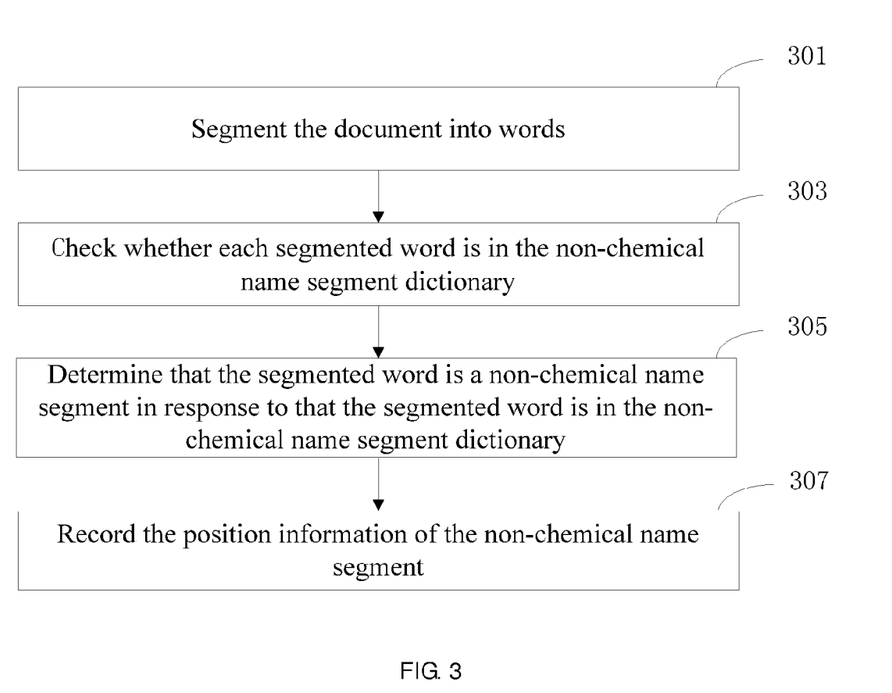
FIG. 3 illustrates a preferred specific embodiment for recognizing non-chemical name segments in a Chinese document.

FIG. 3 illustrates a specific embodiment of recognizing non-chemical name segments in the document. Step 301 includes segmenting the Chinese sentences into words. A prior art technique such as HMM (Hidden Markov Model) or CRF (Conditional Random Field) can be used to segment it into words; Step 303 includes checking whether each segmented word is in the non-chemical name segment dictionary by matching each segmented word with the non-chemical name segment dictionary; Step 305 includes, in response to a segmented word being in the non-chemical name segment dictionary, determining that the segmented word is a non-chemical name segment; and Step 307 includes recording the position information of the non-chemical name segment. Further, according to the obtained non-chemical name segments and the position relationship thereof, a set of non-chemical name segments similar to that of Table 1 can be obtained. Of course, a similar reduction on the set of non-chemical name segments can be performed, so as to get a reduced set of non-chemical name segments.

Figure 4:
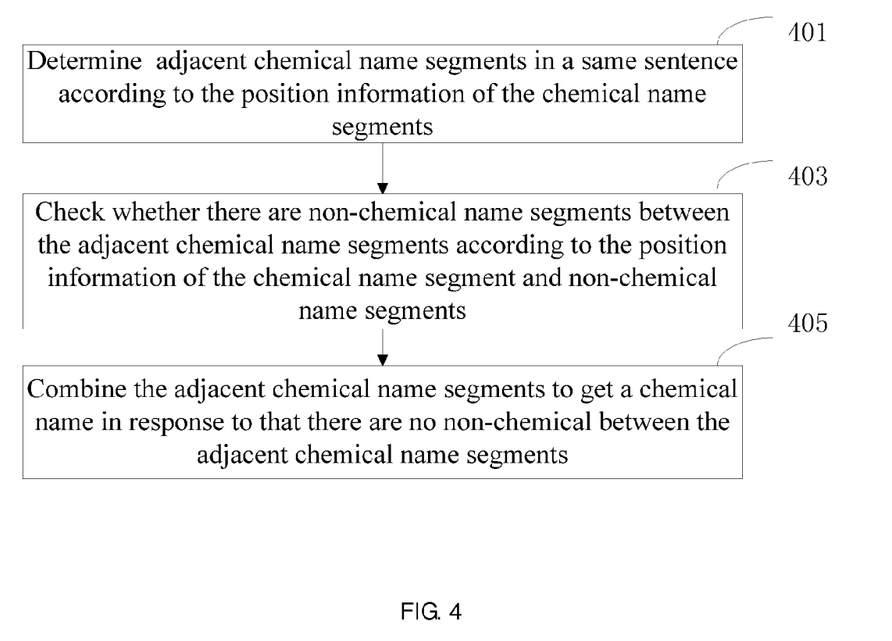
FIG. 4 illustrates a preferred specific embodiment for combining chemical name segments.

FIG. 4 illustrates a preferred embodiment of combining the chemical name segments to get the chemical names. Step 401 includes determining the adjacent chemical name segments in a same sentence according to the position information of the chemical name segments. Step 403 includes, according to the position information of the chemical name segments and non-chemical name segments, checking whether there are non-chemical name segments between the adjacent chemical name segments. Step 405 includes, in response to there being no non-chemical name segment in the adjacent chemical name segments, combining the adjacent chemical name segments to get a chemical name. According to the previous specific embodiment, the corresponding chemical name segments and non-chemical name segments and their corresponding position relationship have been obtained when recognizing the chemical name segments and the non-chemical name segments, and thus the information can be used to combine the chemical name segments and obtain the correct chemical names. For example, for the sentence including " 包括有 2-[(4-氯-苯基 )-(2,4-二 氯-苯甲酰基)-氨基 ]-噻唑 -4-甲酸 -乙基酰胺", "氯-", "甲" are included between two chemical name segments, and they are not non-chemical names, therefore, the above adjacent chemical name segments are all combined to form a complete chemical name, "2-[(4--氯-苯基 )-(2,4 -二 氯-苯甲酰基 )- 氨基 ]-噻唑 -4-甲酸二 乙基酰胺". And for the sentence, "(甲酸二乙基酰胺 )以及 ( 苯甲酰胺 )", ( 甲 酸二乙基酰胺 ) and ( 苯甲酰胺 ) are recognized as chemical name segments, while "以及 " are recognized as non-chemical name segments, thus ( 甲酸二乙基酰胺 ) and ( 苯甲酰胺 ) cannot be combined.

Figure 5:
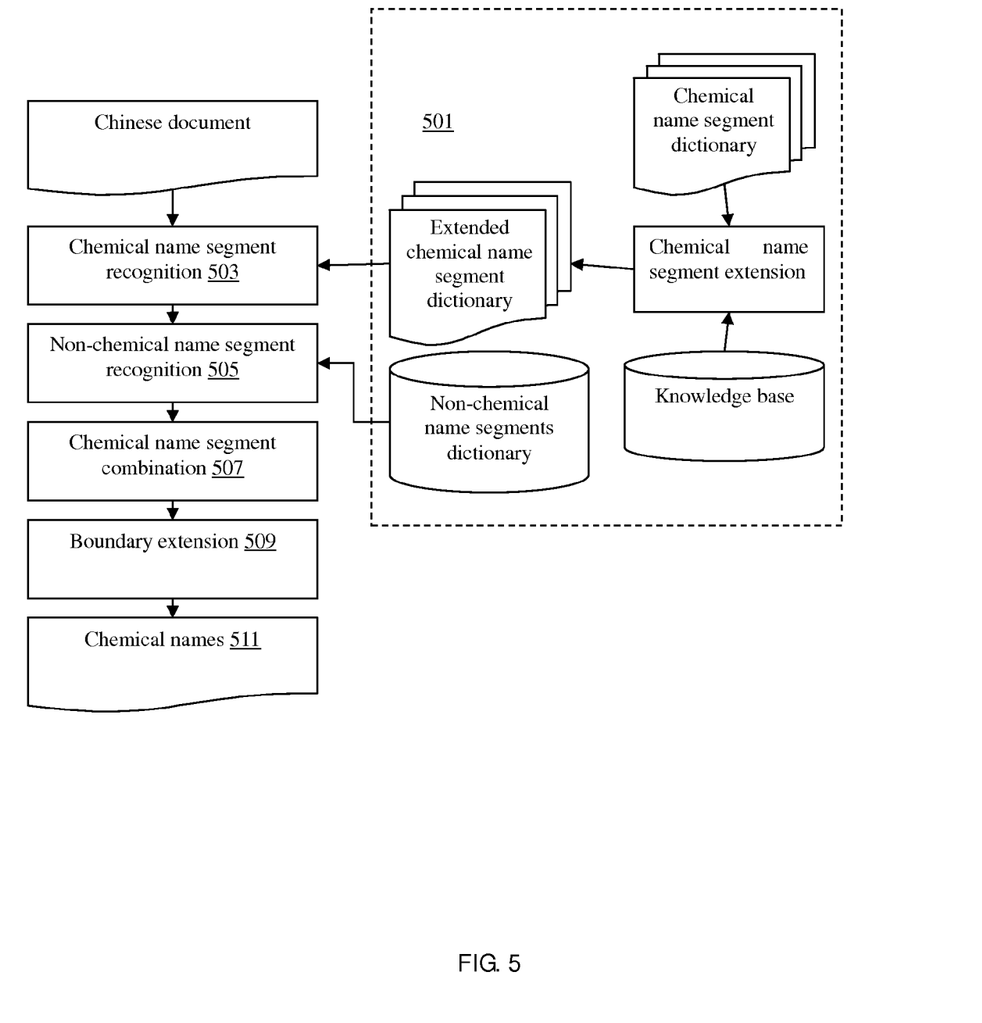
FIG. 5 illustrates a second specific embodiment of the present invention for recognizing chemical names in a Chinese document.

FIG. 5 shows a second specific embodiment of the present invention for recognizing chemical names in a Chinese document, wherein step 501 includes constructing a chemical name segment dictionary and a non-chemical name segment dictionary. Here the chemical name segment dictionary can be extended. It is done by using an expert knowledge base (i.e., an expert can annotate the variable information in the names) to extend the chemical name segment suitable for extension; for example, replacing the variable portion in the name segments, e.g., further extending "乙基酰胺" to other chemical name segments like "甲基酰胺"、"丙基酰胺" to further increase the entries in the chemical name segment dictionary. And steps 503, 505 and 507 include performing the steps of recognizing the chemical name segments and non-chemical name segments and combining the chemical name segments respectively. Step 509 includes extending the boundaries of chemical name segments. Specifically it includes, based on the result of step 507, for all the chemical name segments, extending from the position of the chemical name segment towards both sides until meeting non-chemical name segments, thus getting the chemical name. For example, for the sentence, " . . . , 二(4-羟苯基)醚, . . . ", before the expansion, only the chemical name segment (4-羟苯基) is recognized, but after extending towards both sides, the correct chemical name, 二(4-羟苯基)醚, is obtained. Finally, in step 511, all the recognized chemical names are obtained.

The technical effect of the present invention can be checked by using testing data. The testing data may use a testing document consisting of 800 sentences randomly selected from invention patent documents relating to chemistry published by the Chinese Intellectual Property Office from 2001 to 2008. Table 3 shows an overall effect of chemical name recognition achieved according to the second specific embodiment of the present invention, wherein Precision refers to a ratio of correct annotations to all the annotations, Recall is a ratio of correct annotations to all the correct chemical names in the documents, and F1 (F1-Measure) is an comprehensive evaluation index based on the precision and recall, and it is commonly used in information retrieval and natural language processing. The specific definition of F1 is as follows: F1=2rp/(r+p), wherein r is the recall and p is the precision. It can be seen that, whether it is the precision, recall or the comprehensive evaluation index F1, their numerical values are all close to 90%, which is an effect strongly desired in the field.

TABLE 3

|  | Precision | Recall | F1 |
| --- | --- | --- | --- |
| Overall model | 86.8% | 90.5% | 88.6% |

Figure 6:
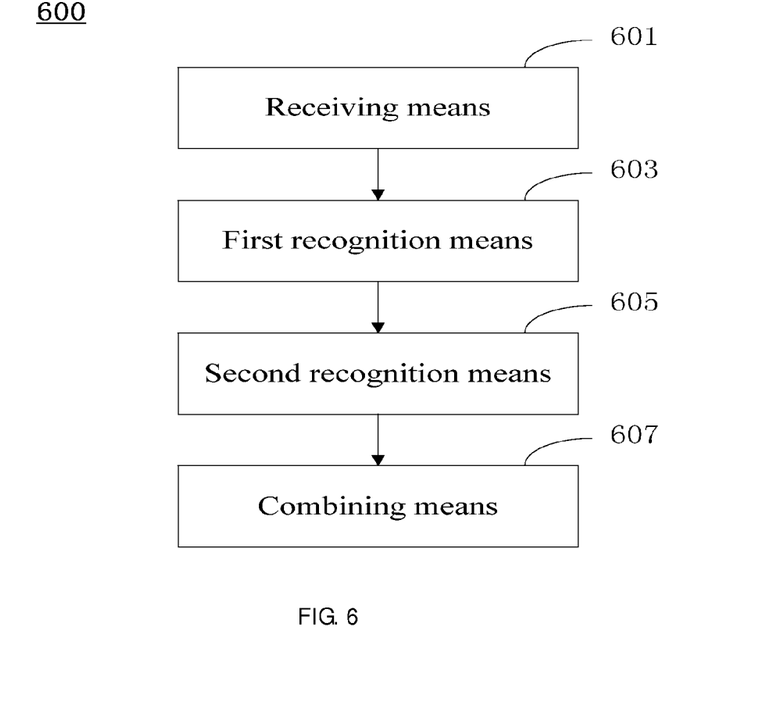
FIG. 6 illustrates a framework diagram of a system of the present invention for recognizing chemical names in a Chinese document.

As shown in FIG. 6, the present invention further provides a system 600 for identifying chemical names in a Chinese document. The system includes: receiving means 601 configured to receive a Chinese document including chemical names; first recognizing means 603 configured to recognize the chemical name segments in the document; second recognizing means 605 configured to recognize the non-chemical name segments in the document; and combining means 607 configured to, based on the recognized chemical name segments and non-chemical name segments, combine the chemical name segments to get the chemical names.

In another aspect of the present invention, the first recognizing means 603 includes: sentence-segmenting means configured to segment the document into sentences; matching means configured to match all chemical name segments appearing in the sentences of the document based on a chemical name segment dictionary; first recording means configured to record the position information of the chemical name segments; and reducing means configured to reduce the chemical name segments in a same sentence.

In another aspect of the present invention, the second recognizing means 605 includes: word-segmenting means configured to segment words in the document; first checking means configured to check whether each segmented word is in a non-chemical name segment dictionary; first determining means configured to, in response to the segmented word being in the non-chemical name segment dictionary, determine that the segmented word is a non-chemical name segment; and second recording means, configured to record the position information of the non-chemical name segment.

In another aspect of the present invention, the non-chemical name segments are used as separators when the chemical name segments are combined to get the chemical names.

In another aspect of the present invention, the combining means 607 includes second determining means configured to, based on the position information of the chemical name segments, determine adjacent chemical name segments in a same sentence; second checking means configured to check whether there are non-chemical name segments between the adjacent chemical name segments, based on the position information of the chemical name segments and the non-chemical name segments; and combination executing means configured to combine the adjacent chemical name segments to get a chemical name in response to there being no non-chemical name segments between the adjacent chemical name segments.

In another aspect of the present invention, the system 600 further includes: extending means configured to extend from the positions of the chemical name segments towards both sides until meeting non-chemical name segments to obtain the chemical names.

In another aspect of the present invention, the position information includes the start positions and end positions in the document of one of the chemical name segments and the non-chemical name segments, and sequence numbers of the sentences where they are.

In another aspect of the present invention, the system 600 further includes at least one of the following means: chemical name segment dictionary generating means, configured to generate a chemical name segment dictionary from existing Chinese chemical names; and a non-chemical name segment dictionary generating means configured to form a non-chemical name segment dictionary based on words with high frequency collected from Chinese documents in non-chemical fields.

In another aspect of the present invention, reducing the chemical name segments in a same sentence is performed according to the principal of matching the most chemical name segments by the least number of chemical name segments.

In another aspect of the present invention, the chemical name segment dictionary generating means is able to generate a chemical name segment dictionary from existing English chemical names.

Figure 7:
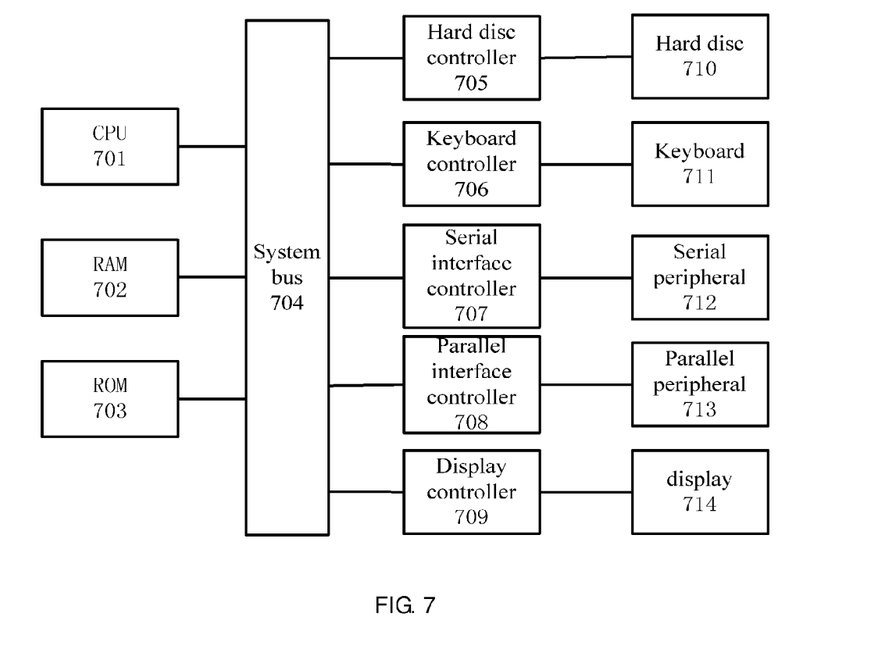
FIG. 7 illustrates a structural block diagram of a computing device that may implement embodiments of the present invention.

FIG. 7 shows an exemplary computer system 700 which is applicable in implementing embodiments of the present invention. As shown in FIG. 7, the computer system 700 can include: CPU (Central Process Unit) 701, RAM (Random Access Memory) 702, ROM (Read Only Memory) 703, System Bus 704, Hard Drive Controller 705, Keyboard Controller 706, Serial Interface Controller 707, Parallel Interface Controller 708, Display Controller 709, Hard Drive 710, Keyboard 711, Serial Peripheral Equipment 712, Parallel Peripheral Equipment 713 and Display 714. Among above devices, CPU 701, RAM 702, ROM 703, Hard Drive Controller 705, Keyboard Controller 706, Serial Interface Controller 707, Parallel Interface Controller 708 and Display Controller 709 are coupled to the System Bus 704. Hard Drive 710 is coupled to Hard Drive Controller 705. Keyboard 711 is coupled to Keyboard Controller 706. Serial Peripheral Equipment 712 is coupled to Serial Interface Controller 707. Parallel Peripheral Equipment 713 is coupled to Parallel Interface Controller 708. Display 714 is coupled to Display Controller 709.

The functions of each component in FIG. 7 are well-known in the art, and the structure shown in FIG. 7 is also conventional. Such a structure is applicable not only in a personal computer, but also in a handheld device, e.g., Palm PC, PDA (personal digital assistant), mobile phone, etc. In different applications, e.g., when implementing a user terminal including a client module according to the present invention or server host including a network application server according to the present invention, some components can be added into the structure shown in FIG. 7, or some components in FIG. 7 can be omitted. The entire system shown in FIG. 7 is controlled by computer readable instructions which are usually stored as software in hard disc 710, or EPROM or other non-volatile storage. The software may also be downloaded from network (not shown), or stored in hard disc 710, or the software downloaded from the network can be loaded into RAM 702 and executed by CPU 701 so as to accomplish the functions defined by the software.

Although the computer system described in FIG. 7 can support the technical solution provided according to the present invention, the computer system is only one example of computer systems. Those skilled in the art may appreciate that many other computer system designs can also realize the embodiments of the present invention.

Although embodiments of the present invention are described in detail above in conjunction with specific embodiments, it should be understood that the present invention is not limited thereto. Those skilled in the art can make various changes and modifications without departing from the spirit and scope of the present disclosure. All these changes and modifications are intended to be included in the scope of the present invention as defined by the appended claims.

Moreover, according to the above description, those skilled in the art may appreciate that aspects of the present invention can be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable non-transient program code embodied thereon.

Any combination of one or more computer-readable medium(s) can be utilized. The computer-readable medium can be, for example but is not limited to, an electronic, magnetic, optical, electromagnetic, infrared, or semiconductor system, apparatus, device, or any combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium can be any medium that can contain, store, communicate, propagate, or transport the program for use by or in connection with the instruction execution system, apparatus, or device. The computer readable signal medium may include a propagated data signal with the computer-readable program code embodied therewith, either in baseband or as part of a carrier wave. The computer-readable program code can be transmitted using any appropriate medium, including but not limited to wireless, wireline, optical fiber cable, RF, etc Computer non-transient program code for carrying out operations for aspects of the present invention can be written in any combination of one or more programming languages, including an object oriented programming language such as Java™, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

In addition, each block of the flowchart illustrations and/or block diagrams of the present invention, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means that implements the function/act specified in the flowchart and/or block diagram block or blocks. The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures of the present invention illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method comprising:
a computer device receiving a Chinese document including chemical names;
the computer device recognizing chemical name segments in said document;
the computer device recognizing non-chemical name segments in said document, wherein the computer device recognizing said non-chemical name segments in said document comprises:
segmenting said document into words;
checking whether each segmented word is in a non-chemical name segment dictionary;
provided that said segmented word is in said non-chemical name segment dictionary, determining said segmented word to be a non-chemical name segment; and
recording position information of said non-chemical name segment; and
the computer device combining said chemical name segments to get said chemical names based on said recognized chemical name segments and non-chemical name segments to recognize said chemical names in Chinese documents, wherein the computer device recognizing said chemical name segments in said document comprises:
segmenting said document into sentences;
matching all of said chemical name segments appearing in sentences of said document based on a chemical name segment dictionary;
recording position information of said chemical name segments; and
reducing said chemical name segments in a same sentence, wherein reducing said chemical name segments in a same sentence is performed according to a principle of matching the most chemical name segments with the least number of chemical name segments; and
wherein the computer device combining said chemical name segments to get said chemical name based on said recognized chemical name segments and non-chemical name segments comprises:
determining adjacent chemical name segments in a same sentence according to said position information of said chemical name segments;
checking whether there are non-chemical name segments between said adjacent chemical name segments based on said position information of said chemical name segments and non-chemical name segments; and
provided that there are no non-chemical name segments between said adjacent chemical name segments, combining said adjacent chemical name segments to get a chemical name.

2. The method according to claim 1, wherein said non-chemical name segments are used as separators in combining said chemical name segments to get said chemical names.

3. The method according to claim 1, further comprising:
the computer device extending towards both sides from positions of said chemical name segments until meeting non-chemical name segments, so as to obtain the chemical names.

4. The method according to claim 1, wherein:
said position information includes the start positions and end positions of one of said chemical name segments and non-chemical name segments in said document.

5. The method according to claim 1, further comprising at least one:
the computer device generating said chemical name segment dictionary from existing Chinese chemical names; and
the computer device forming said non-chemical name segment dictionary based on words with high frequency collected from Chinese documents in non-chemical fields.

6. The method according to claim 5, further comprising:
the computer device generating said chemical name segment dictionary from existing English chemical names.

7. A system comprising:
one or more processors, one or more computer-readable memories and one or more computer-readable, tangible storage devices;
a receiving module configured to receive a Chinese document including chemical names;
a first recognizing module configured to recognize chemical name segments in said document;
a second recognizing module configured to recognize non-chemical name segments in said document, wherein said second recognizing module comprises:
a word-segmenting module configured to segment said document into words;
a first checking module configured to check whether each segmented word is in a non-chemical name segment dictionary;
a first determining module configured to, provided that said segmented word is in said non-chemical name segment dictionary, determine said segmented word to be a non-chemical name segment; and
a second recording module configured to record position information of said non-chemical name segment; and
a combining module configured to combine said chemical name segments to get said chemical names based on said recognized chemical name segments and non-chemical name segments to recognize said chemical names in Chinese documents, wherein said first recognizing module comprises:
a sentence-segmenting module configured to segment said document into sentences;
a matching module configured to match all of said chemical name segments appearing in sentences of said document based on a chemical name segment dictionary;
a matching module configured to record position information of said chemical name segments; and
a reducing module configured to reduce said chemical name segments in a same sentence, wherein reducing said chemical name segments in a same sentence is performed according to a principle of matching the most chemical name segments with the least number of chemical name segments, and wherein said combining module further comprises:
- a second determining module configured to determine adjacent chemical name segments in a same sentence according to said position information of said chemical name segments;
- a second checking module configured to check whether there are non-chemical name segments between said adjacent chemical name segments based on said position information of said chemical name segments and non-chemical name segments; and
- a combination executing module configured to, provided that there are no non-chemical name segments between said adjacent chemical name segments, combine said adjacent chemical name segments to get a chemical name.

8. The system according to claim 7, wherein said non-chemical name segments are used as separators in combining said chemical name segments to get said chemical names.

9. The system according to claim 7, wherein said system further comprises: additional one or more processors, one or more computer-readable memories and one or more computer-readable, tangible storage devices; and
- an extending module configured to extend towards both sides from the position of said chemical name segments until meeting non-chemical name segments, so as to obtain the chemical names.

10. The system according to 11, wherein:
said position information includes the start positions and end positions of one of said chemical name segments and non-chemical name segments in said document.

11. The system according to claim 7, further comprising at least one of:
- additional one or more processors, one or more computer-readable memories and one or more computer-readable, tangible storage devices; and
- a chemical name segment dictionary generating module configured to generate said chemical name segment dictionary from existing Chinese chemical names; or
- a non-chemical name segment dictionary generating module configured to form said non-chemical name segments dictionary based on words with high frequency collected from Chinese documents in non-chemical fields.

12. The system according to claim 11, wherein said chemical name segment dictionary generating module generates said chemical name segment dictionary from existing English chemical names.

* * * * *